(12) United States Patent
Hubacher et al.

(10) Patent No.: US 6,711,688 B1
(45) Date of Patent: *Mar. 23, 2004

(54) PRE-EXECUTION LOGON (PEL)

(75) Inventors: Kenneth Hubacher, Cedar Park, TX (US); Dennis Sposato, Austin, TX (US); Philip C. Theiller, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/451,953

(22) Filed: Nov. 30, 1999

(51) Int. Cl.[7] .................................. H04L 9/00
(52) U.S. Cl. .................. 713/201; 713/154; 713/184; 713/190; 713/202
(58) Field of Search ................ 713/201, 154, 713/184, 190, 202

(56) References Cited

U.S. PATENT DOCUMENTS

| 5,436,905 | A | | 7/1995 | Li et al. ................... 370/95.2 |
|---|---|---|---|---|
| 5,577,210 | A | * | 11/1996 | Abdous et al. ............. 709/219 |
| 5,675,800 | A | * | 10/1997 | Fisher et al. .................... 713/2 |
| 5,729,542 | A | | 3/1998 | Dupont ........................ 370/346 |
| 5,828,888 | A | * | 10/1998 | Kozaki et al. ............... 717/170 |
| 5,842,011 | A | | 11/1998 | Basu ........................... 395/652 |
| 5,870,554 | A | | 2/1999 | Grossman et al. ...... 395/200.52 |
| 5,948,101 | A | * | 9/1999 | David et al. .................... 713/2 |
| 5,974,547 | A | * | 10/1999 | Klimenko ....................... 713/2 |
| 6,052,779 | A | * | 4/2000 | Jackson et al. ................ 713/2 |
| 6,209,089 | B1 | * | 3/2001 | Selitrennikoff et al. ........ 713/2 |
| 6,226,667 | B1 | * | 5/2001 | Matthews et al. .......... 709/203 |
| 6,292,890 | B1 | * | 9/2001 | Crisan ........................... 713/2 |
| 6,356,965 | B1 | * | 3/2002 | Broyles et al. ............. 710/104 |
| 6,421,777 | B1 | * | 7/2002 | Pierre-Louis et al. .......... 713/2 |
| 6,487,601 | B1 | * | 11/2002 | Hubacher et al. ........... 709/229 |
| 6,539,473 | B1 | * | 3/2003 | Hubacher et al. .............. 713/2 |

* cited by examiner

Primary Examiner—Justin T. Darrow
Assistant Examiner—K Zand
(74) Attorney, Agent, or Firm—David A. Mims, Jr.; Rudolf O. Siegesmund

(57) ABSTRACT

An apparatus and method to control access to operating systems sent by a server computer system to a client computer system in response to a request by the client computer system utilizing a pre-execution logon verification of user identification and password and override of the Universally Administered Address by a Locally Administered Address corresponding to the boot package to be sent to the client workstation.

7 Claims, 9 Drawing Sheets

PRE-EXECUTION LOGON (PEL)

FIELD OF THE INVENTION

The present invention relates to the control of access to operating systems sent by a server computer system to a client computer system in response to a request by the client computer system utilizing a pre-execution logon verification of user identification and password and override of the Universally Administered Address (UAA) by a locally Administered Address (LAA) corresponding to the boot package to be sent to the client workstation.

BACKGROUND OF THE INVENTION

A computer or computer system, when turned on, must be prepared for operation by loading an operating system. In the normal operation of a single computer system, when a user issues a boot command to the computer, the computer responds to the boot command by attempting to retrieve the operating system files from the computer systems memory. Configuration data files are also needed to configure the specific machine with the hardware parameters necessary for the specific hardware configuration. These files also contain information needed to initialize videos, printers, and peripherals associated with the particular machine. For example, the files would include CONFIG.SYS in the MS-DOS operating system, available from Microsoft Corporation.

Computers or computer systems can be connected in a network normally consisting of a client workstation, a server and a central network. In a system where the computer's storage is maintained when the power is turned off, the operating system can be stored in the computer itself In a system where the computer has only storage that is lost when the power is turned off, the computer cannot retrieve the boot information from within the computer itself In that case, the client sends a request for the operating system files via the network to the server acting as a boot server. Even when the client workstation has non-volatile storage capability, it is advantageous to boot from the server because memory space is saved in the workstation computer. As operating system and application programs expand to provide new and greater capabilities, booting from a server can be highly advantageous.

Several methods of remote booting exist in the marketplace. One is called Remote Initial Program Load (RIPL). RIIPL is the process of loading an operating system onto a workstation from a remote location. The RIPL protocol was co-developed by 3Com, Microsoft, and IBM. It is used today with IBM OS/2 Warp Server, DEC Pathworks, and Windows NT. Two other commonly used Remote IPL protocols are a Novell NCP (NetWare Core Protocol), and BOOT-P, an IEEE standard, used with UNIX and TCP/IP networks.

RIPL is achieved using a combination of hardware and software. The requesting device, called the requester or workstation, starts up by asking the loading device to send it a bootstrap program. The loading device is another computer that has a hard disk and is called the RIPL server or file server. The RIPL server uses a loader program to send the bootstrap program to the workstation. Once the workstation receives the bootstrap program, it is then equipped to request an operating system, which in turn can request and use application programs. The software implementations differ between vendors, but theoretically, they all perform similar functions and go through a similar process. The client workstation requires a special Read Only Memory (ROM) installed on its (Local Area Network) LAN adapter or Network Interface Card (NIC). The special ROM is known generally as a remote boot ROM, but two specific examples of remote boot chips are the RIPL chip, which supports ANSI/IEEE standard 802.2, and the Preboot Execution Environment (PXE) chip, which is used in the Transmission Control Protocol/Internet Protocol (TCP/IP) environment.

While the process has many advantages for booting a computer that has volatile storage, such as a network computer, the computer is required to have a remote boot ROM on the LAN adapter or Network Interface Card (NIC). The remote boot ROM requirement does not allow any user interaction with the remote boot process.

Application Ser. No. 09/389,440 now U.S. Pat. No. 6,539,473 B1 discloses a remote client boot allowing a client computer to boot from a server without the remote boot ROM requirement.

The client's Media Access Control (MAC) address is the key factor that determines many characteristics of the boot process. The MAC address determines what server the client will boot from, what operating system will be loaded and what the client's computers configuration will be.

A need arises in a remote boot environment to control access to the operating systems offered by the server. In other words, the administrator should have the capability to prevent booting by unauthorized users, prior to the loading of the operating system. Security products exist in the marketplace to prevent unauthorized booting; however, a need exists for a security program that is administered solely at the server level. Thus, no security file would be kept on the client system. Present remotely administered pre-boot security systems, require the security file to be downloaded to the client system after the system has been booted. A need exists for a system that can operate without such a requirement.

Moreover, given the capability of RIPL/PXE boot environment, a need exists for a security logon system that can also provide specific work station environments to the client machine, based on user ID. For example, if a user is a bank teller, anytime that user boots a system, regardless of which physical system it is, the user would receive a "teller's" system. Alternatively, if the user were identified as an administrator, the user would receive an admrinistrator's package. The Remotely Controlled Boot Manager (BCB comprises a set of programs at the workstation and as menu control program at the server.

SUMMARY OF THE INVENTION

The invention meeting the needs identified above is a PRE-EXECUTION LOGON (PEL) which provides an apparatus and method to allow a server in a LAN environment to validate a user's ID and password prior to booting a client system. When the client system is started, PEL will present a logon screen to the user. The logon information will be sent to a server application that will validate the information and either allow a boot, on the client, or not. In addition, in a RIPL/PXE boot environment, PEL can provide a specific system "personality" to the user regardless of which physical client machine the user is using. PEL augments LAN system security by preventing client systems from booting when the user is unknown to the server. Other security systems require an operating system to be loaded in the client machine before a logon can be started. PEL's advantage, as a security feature, is that it prevents booting by unauthorized users, prior to the loading of the operating system. When used in a RIPL/PXE boot environment, PEL can also provide specific work station environments to the client machine, based on user ID. PEL, when used with the Remotely Controlled Boot, allows an adminstrator to customize a system personality, by user ID. In other words, regardless of which machine the user logs on to, the user will get the specific system set up for him him by the administrator.

The first part of the process is to set up the capability for remote booting. In the preferred embodiment, a set of programs at the workstation allows a remote boot and interaction with a program on the server. Instructions from a Basic Input Output System (BIOS) ROM are executed to load a Boot Code Loader (BCL) from a nonvolatile, read/write memory, such as a diskette or hard disk. The BCL executes to load a Remote Control Program (RCP), and the RCP executes to load a message program, a protocol manager and/or device drivers without loading an operating system. The message program and/or device drivers communicate with a PRE-EXECUTION LOGON (PEL) program in the network server. First, the program will interface with an NDIS compliant Network Interface Card (NIC) to send out a PEL discovery frame. The discovery frame will be intercepted by a PEL program installed on a server which will be running and listening for the request. Once the PEL program intercepts the request it will present a logon screen to the workstation user. The user will enter his or her user identification and password. The PEL will validate the user identification number and password. Upon validation the server, will either send a boot operating system which is not specifically assigned to that user identification or the server will send an LAA to the client workstation based on an assignment by the administrator. The client workstation will then request an operating system with its new LAA. The boot options will be a table or pool corresponding to an LAA or range of LAA's. In other words, a particular boot option or package will be sent to a system making a request that has the corresponding LAA. In order to achieve the override of the UAA the PEL will assign an LAA to the workstation. Once the LAA, is assigned the boot will proceed based on the package that will be shipped to that address.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
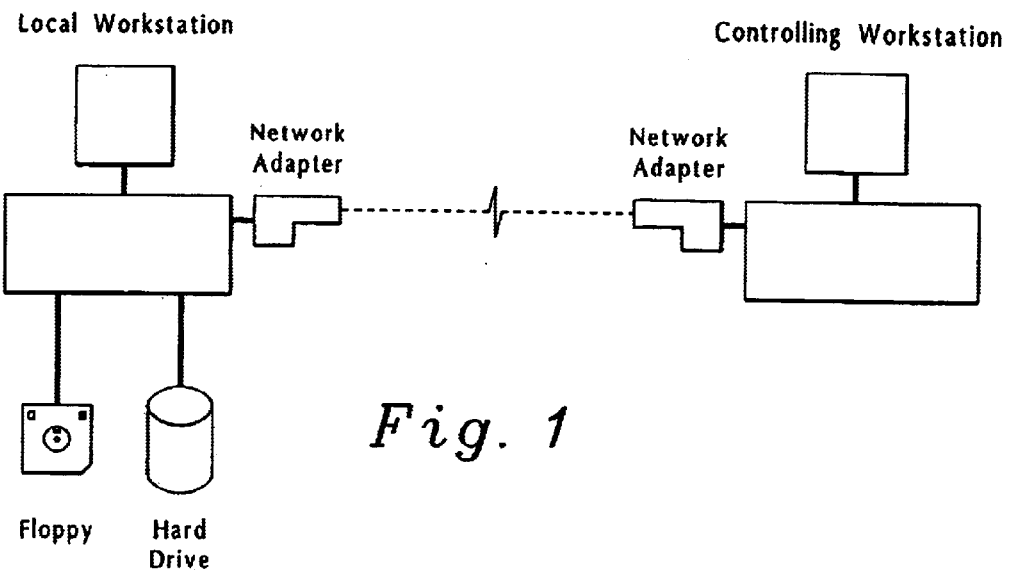
FIG. 1 depicts an overview of the system.
Figure 1A:
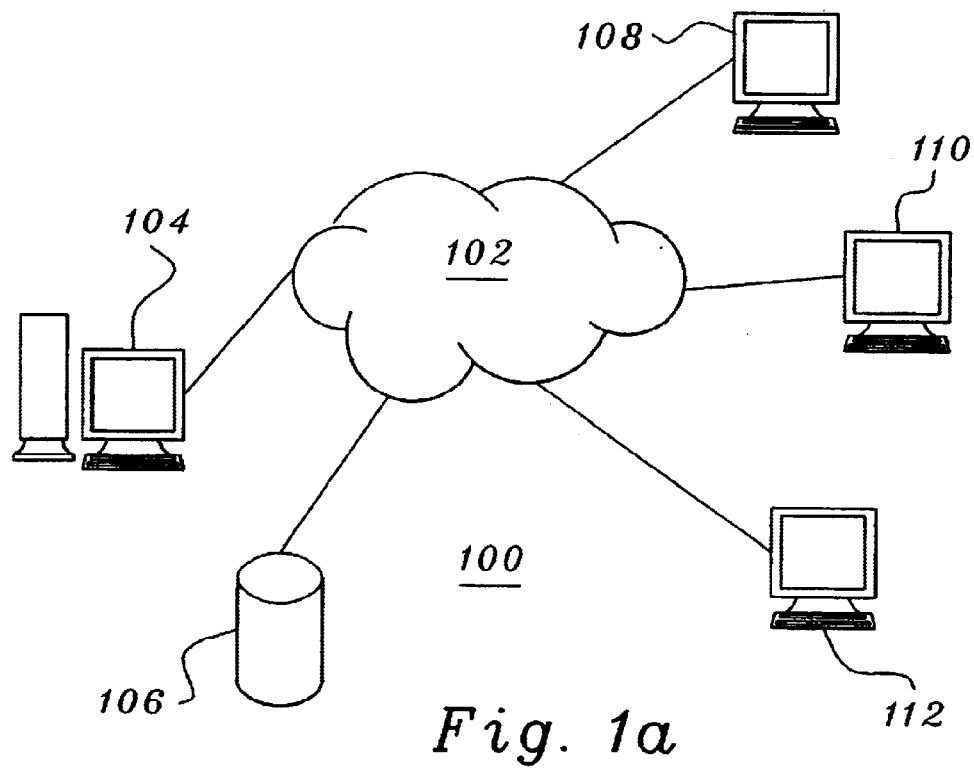
FIG. 1A depicts a distributed data processing system.

FIG. 1A depicts a pictorial representation of a distributed data processing system in which the present invention may be implemented and is intended as an example, and not as an architectural lirnitation, for the processes of the present invention. Distributed data processing system 100 is a network of computers which contains a network 102, which is the medium used to provide communications links between various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

Figure 2:
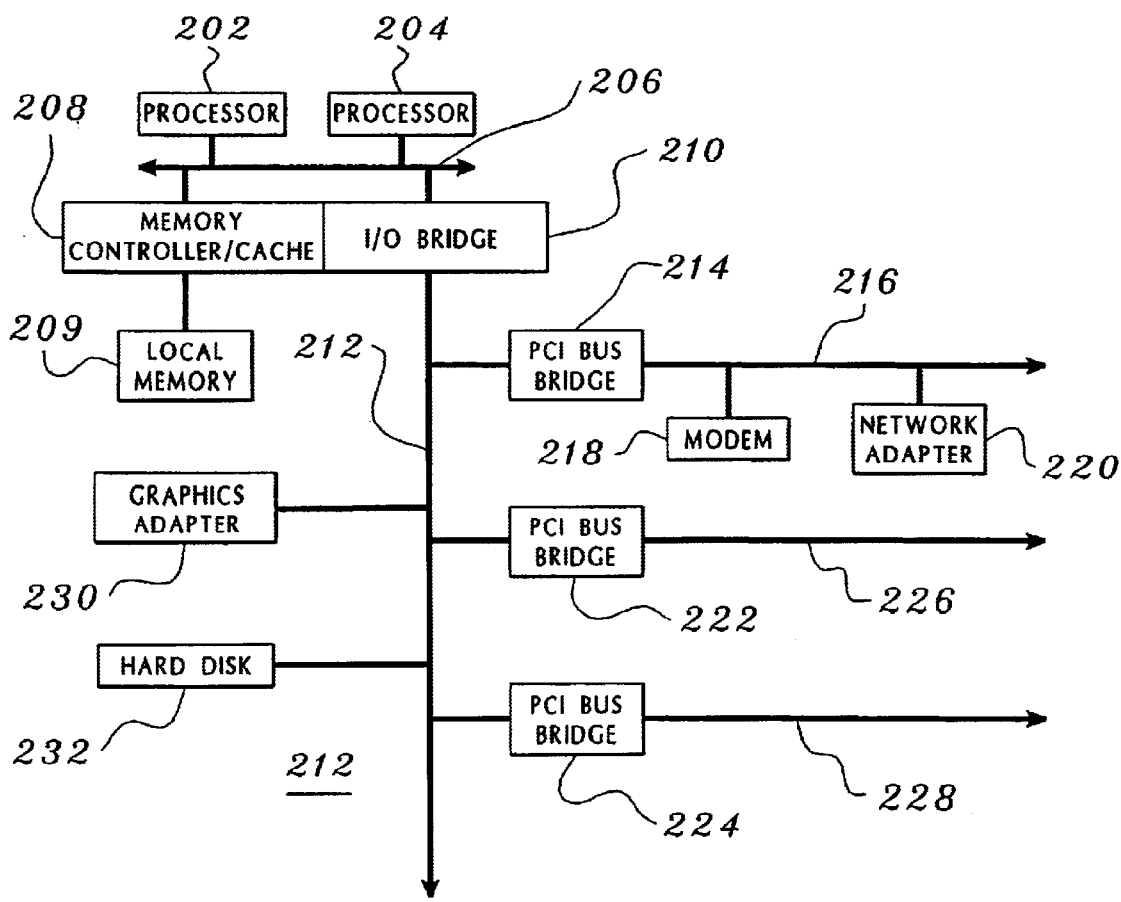
FIG. 2 depicts a block diagram of a server.

For purposes of this application, a network computer is any computer, coupled to a network, which receives a program or other application from another computer coupled to the network. In the depicted example, server 104 provides data, such as boot files, operating system images, and applications to clients 108, 110 and 112. Clients 108, 110, and 112 are clients to server 104. Server 104 may also act as a boot server because it stores the files and parameters needed for booting each of the unique clients 108, 110, and 112. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distrbuted data processing system 100 nmay also be implemented as a number of different types of networks, such as for example, an intranet, a local area network (LAN), or a wide area network (WAN). Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component intercoimect (PCI) bus bridge 214 connected to I/O bus 212 provides an intere to PCI local bus 216. Modem 218 may be connected to PCI local bus 216. Typical PCI bus implementations will support four PCI expansion slots or add-in connectors. Communication links to clients 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported In this manner, data processing system 200 allows connections to multiple network computers. A mnemory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devies, such as optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y. running the Advanced Interactive Executive (AIX) operating system.

Figure 3:
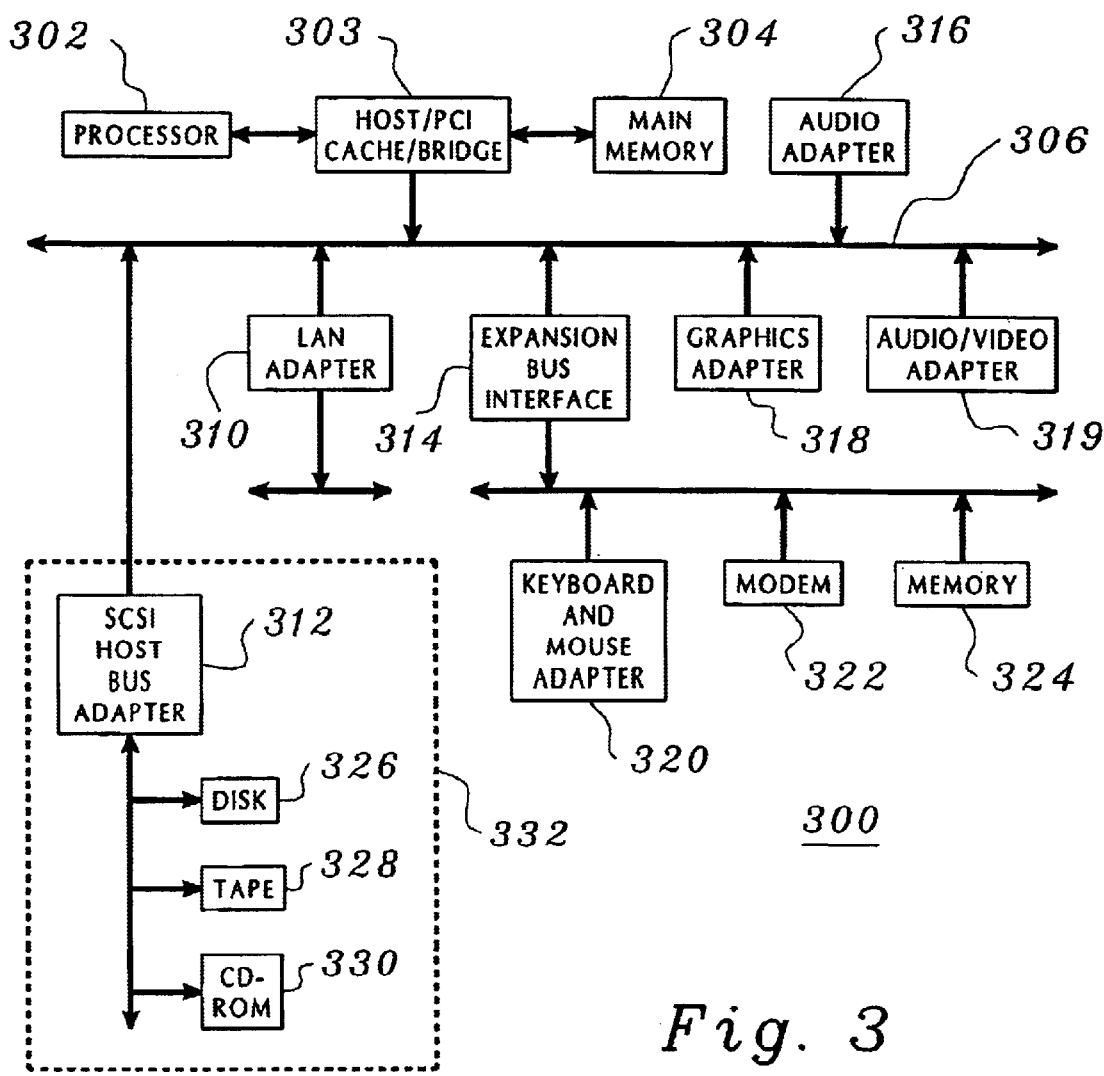
FIG. 3 depicts a block diagram of a work station.

With reccruncu now to FIG. 3, a block diagram illustrates a data processing sysrtem in which the RCP may be implemented. Data processing system 300 is an example of either a stand-alone computer, if not connected to distributed data processing system 100, or a client computer, if connected to distributed data processing system 100. Data processing system 300 employs a peripheral component intcrconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 383 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video (A/V) adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a colnercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Inc. Instructions for the operating system, the object-oriented operating system, and applications or programs may be located on storage devices, such as hard disk drive 326, and they may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. In addition, the processes of the present invention may be applied to a multiprocessor data processing system. For example, data processing system 300, if optionally configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client wmputer, must include some type of network communication interface, such as LAN adapter 310, modem 322, or the like. As another example, data processing system 300 may be a stand-alone system configured to be bootable without rclying on soinc type of network communication interface, whether or not data processing system 300 comprises some type of network communication interface. As a further example, data processing system 300 may be a Personal Digital Assistant (PDA) device which is configured vith ROM and/or flash ROM in order to provide non-volatile memory for storing operating system files and/or user-generated data. The depicted example in FIG. 3 and above-described examples are not meant to imply architectural limitations with respect to the present invention. It is important to note that wvhile the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearng media actually used to carry out the distribution. Examples of computer readable media include recordable-type media, such as a floppy disk, a hard disk drive, a RAM, and CD-ROMs, and transmission-type media, such as digital and analog communications links.

Figure 4:
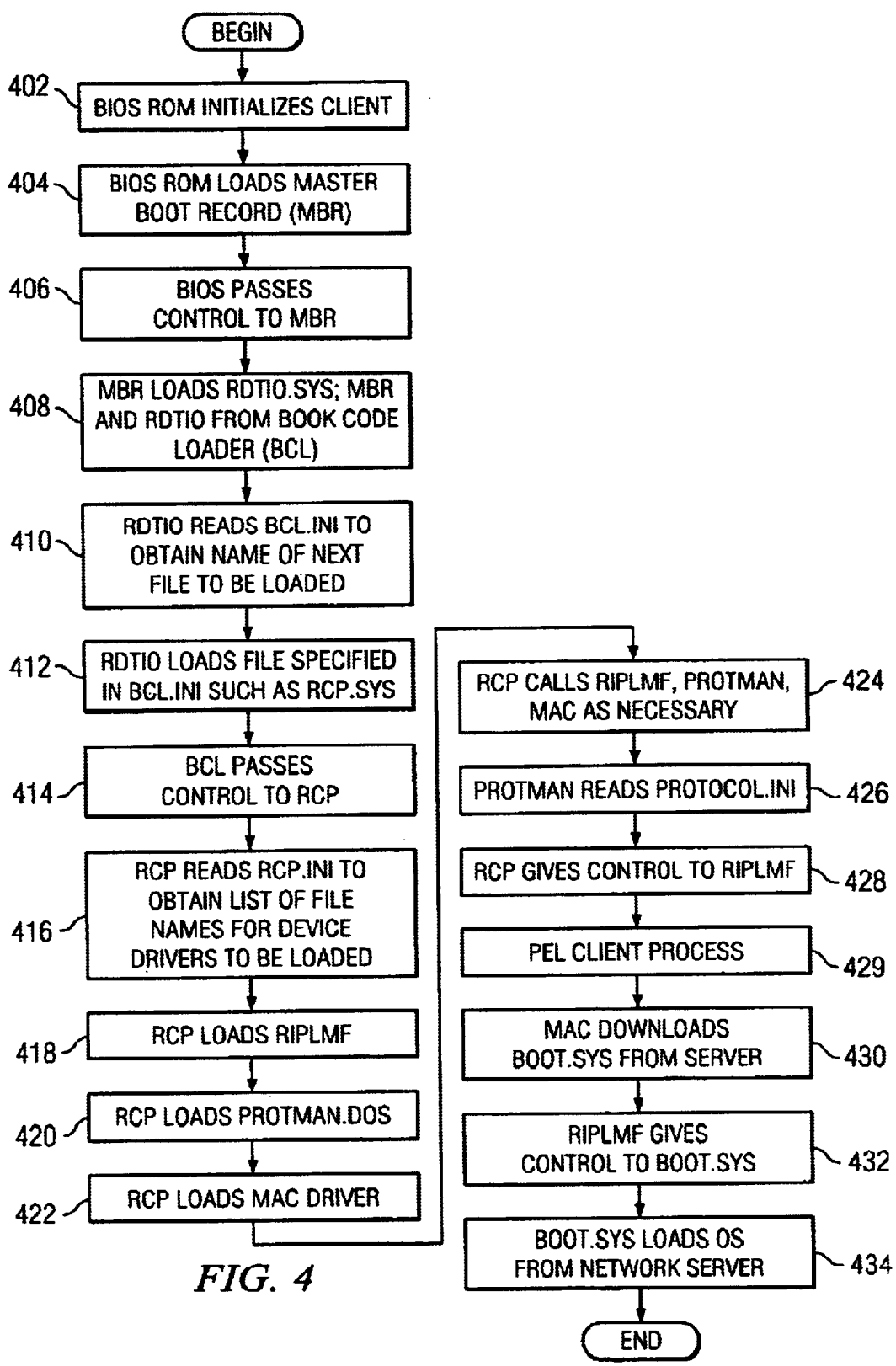
FIG. 4 depicts a flow chart of the workstation process.

With reference now to FIG. 4, a flowchart depicts the steps used in the PEL. When a PC is booted, the BIOS ROM chip initializes the system by executing POST (Power-on Self-Test) code and by setting up the BIOS vector tables in low memory and by selecting a boot source (step 402). On newer systems, this is a selectable parameter in the hardware system BIOS setup procedure. If the system has been allowed to select a diskette drive or hard drive as a boot device, BIOS ROM instructions reads the first sector of the diskette into memory at a predefined location (step 404). This sector is called the Master Boot Record (MBR). The BIOS then gives control to MBR (step 406).

The MBR, Cyl 0, Head 0, Sector 1 of the diskette is the first thing loaded into the client system after POST processing is completed. The MBR module is no larger than 512 bytes and contains the partition boot table for the diskette. The MBR module also contains an identity stamp and a micro file system with the ability to load a RDT Input Output Module (RDTIO) (step 408). The micro file system has the capability of reading one sector of any file contained in the root directory of a diskette employing the 12-bit FAT architecture. The file name for RDTIO is hard-coded in the MBR and is not user-changeable.

RDTIO.SYS is a one sector file that is read into memory by the MBR. Together, the RDTIO and the MBR make up the BCL. RDTIO adds enough capability to the file system to allow reading additional files.

The first file read by BCL is its initialization file. This file, BCL.INI, contains the name of a self loading, multi-sectored file that can be found in the root directory of the diskette. When this file is successfully read into memory, it will be give control and BCL will no longer be required. The syntax for the BCL.INI file is very restrictive. There are only two parameters in capital letters. The parameters are the name of the file to load and the address of the desired location. For example, RCP.SYS,0000:7C00. This instructs the BCL to load file RCP.SYS at location 000:7C00 in real memory. There is no error checking so the file must be in the root directory of the diskette. If the address field is optional, the 7C00 is the default. However, if the address filed is used, the address filed allows the BCL to load images directly into memory from the disk or diskette. The file name must start at the first location in the file.

BCL.INI contains the name of the next file to load (step 410). BCL.INI specifies a file that contains a self-supporting program or module, as it will be given control at a predetermined area and BCL will terminate execution, leaving the newly loaded module on its own. In RCB's case, this file's name is RCP.SYS-RDT, or the "RDT Control Program" which consists of RCP.SYS and RCP.INI. The RDT Control Program is loaded by the BCL. Once loaded, there is no longer any dependency on the BCL for services. The RCP contains its own mini file system consisting of enough logic to read multi-sectored files from the root directory of a diskette which is formatted using 12-bit FAT architecture.

RDTIO loads RCP.SYS (step 412) and passes control to RCP (step 414). RCP's task is to load additional files, such as device drivers, provide DOS function emulation in support of these drivers, and load other components of RCB, specifically the RIPL Message Formatter (RIPLMF). RCP receives its instructions from an .INI file called RCP.INI (step 416) in the root directory of the diskette. These instructions are in the form of file names. RCP.INI will be parsed and displayed on the console as it is used. The purpose of the IM file is to tell RCP which drivers it needs to load to support the particular NIC on the system in which it is running. The RCP also has the responsibility of providing DOS function emulation to the device drivers when they are in their initialization routines. RCP allows the device drivers to execute as though they were in a real DOS environment. RCP further allows different drivers to be loaded for individual NICs without forcing source code changes in the RCP. The syntax is:

- msgf=[file name] where "file name" is the name of any "Message Formatter" that is to be used for this boot, i.e.: "msgf=riplmf.sys".
- load=[file name] where "file name" is the name of any module that has to be loaded to make RCB work. At a minimum, the DOS device drivers, for the NIC in the machine, must be identified this way, i.e.: "load=device.sys".
- "ip=[ip address] where "ip address" is the dotted decimal IP address, i.e.: ip=123.456.789.012."
- mac=[mac address] where "mac address" is the 12 hex digit MAC address in a continuous string, i.e.: "mac=001122334455".

Each entry must be separated by any, or all, of the following characters:

20h=Space
Oah=Carriage return
Odh=line feed

Almost any editor can be used to create the file.

The RIPLMF is loaded first (step 418) followed by the device drivers. The DOS Protocol Manager (PROTMAN.DOS) is usually loaded next (step 420) followed by the NIC driver, also referred to as the MAC driver (step 422). The RCP will call each driver (step 424), in turn, allowing it to perform its initialization routines, open files, display messages, etc. PROTMAN.DOS will request a file called PROTOCOL.INI to be read in during this time (step 426). This file is requested by the MAC driver from PROTMAN during an inter-module conversation when the MAC is initialized. The MAC causes messages to be sent and received on the LAN.

PROTMAN.DOS is the DOS protocol manager device driver. According to the NDIS specification, "the Protocol Manager reads the PROTOCOL.INI file at INIT time and parses it to create the configuration memory image passed to the protocol modules." The RCB uses it for just that purpose. The MAC driver will issue Input/Output Controls (IOCTLs) to PROTMAN to get this information, as well as information about the protocol drivers that wish to be bound to it. RIPLMF presents itself to PROTMAN.DOS as though it were a protocol driver requesting to be bound to the MAC.

This is done by placing entries in the PROTOCOL.INI file which make RIPLMF look like a protocol driver and through IOCTL calls from RIPLMF to PROTMAN.DOS. RCB emulates most of the other additional BindAndStart and InitiateBind logic which, in a DOS environment, comes from additional support programs. These programs are unnecessary in the RCB system.

The PROTOCOL.INI file used by RCB can be the same one that is included in the BOOT.SYS image assembled in the server with some minor changes. The MF has to be added to it as follows:

[RIPLMF-MOD]
D riverName=RIPLMF$
Bindings=ELPC3

The "Bindings=" statement must point to the MAC driver, in this case ELPC3. The example above was taken from the PROTOCOL.INI used with the 3Com 3C589 PCMCIA Ethernet card.

The entire file looks like this:

[protman$]
    Driver name=protman$
[ELPC3]
    Driver name=ELPC3$
    PCMCIA_ENABLER=YES
[RIPLMF-MOD]
    Driver name=RIPLMF$
    Bindings=ELPC3

The device drivers used by RCB are also called ANSI/IEEE standard 802.2 drivers. RCB requires the drivers specific to the DOS environment. The EL90X.DOS is used to support the #Com3C509 PCI Ethernet card. The ELPC3.DOS driver supports the 3Com#C589 PCMCIA Ethernet card.

When all initialization is complete, RIPLMF is given control (step 428), and the services of RCP are no longer required. RIPLMF is a hybrid application program and NDIS protocol device driver. It follows the NDIS specification in its actions with both PROTMAN and the MAC driver. RIPLMF's relationship to these twvo other programs is that of a protocol driver; however, RIPLMF also "formats" messages and presents them to the MAC for delivery. Since the other drivers must be made to believe they are working in an NDIS environment, RIPLMF also does emulation in two areas, "BindAndStart" and "InitiateBind." According to NDIS, a protocol driver must be bound to a MAC driver. Therefore, RIPLMF binds to the MAC such that the MAC cannot tell the difference between RIPLMF or a DOS NDIS protocol driver.

At this point, the client will send out a PEL discovery frame (step 429) through RIPLMF. The discovery fiame will be sent out and the client machine will wait for any specified time out period. If there is a server responsive to the frame, the server PEL program will send an acknowledgment to the workstation. When the acknowledgment is received, the client workstation will display a logon screen. The user at the client workstation will enter his or her user identification and password at the logon screen. Upon receipt of the user identification and password, the PEL will validate the user identification and password. The PEL will send a LAA to the workstation. The original MAC address is overridden and the client appears to any server as the LAA just assigned.

Once the LAA has been assigned, the RIPLMF asks the MAC to communicate with the server to obtain the boot files. RIPLMF asks the MAC to send: "Find" and "GetFile". The find message is replied to by a "Found" from the server. Once RIPLMF knows the server has been found, it sends out the getfile message. The server responds by sending the boot package to the client, which corresponds to the LAA designated by the administrator.

When all segments of programs assigned by the administrator have been received, RIPLMF resets any vectors that may have been used by RCP and the other drivers, and gives the system over to the programs sent to Boot.sys corresponding to the LAA sent by the server. At this point no components of RCP are required, nor can they be found in the system. The find/found dialog is based on the LAA received from PEL. The administrator will have made the decisions about which choices will be sent to which workstations.

When this file is downloaded (step 430), RIPLMF will perform some housekeeping routines and give control to Boot.sys (step 432). Boot.sys then completes the boot process to load an operating system from the network server (step 434) based on the LAA assigned in the table by the administrator. PEL is the controlling mechanism that interacts with each and every client request for a boot program. The network interface between the client and PEL may be IP based which means that the machine the PEL is running on must also be running TCP/IP. PEL receives UDP datagram request from the client and sends back the information in a UDP packet. One implementation would be written in JAVA. PEL could be run on any platform that has a JVM and is TCP/IP enabled. The following languages are suitable for the programs Assembler, C, C++, Cobol, Pascal, Java, SmallTalk, Perl, Rexx, LISP, APL, BASIC, PLI, PLII. The following protocols are suitable: NETBIO; TCP/IP; 802.2; SNA, SNB, IPX and APPLETALK.

Everything that occurs in the workstation computer is based on the MAC address, which is a hardware name embedded in the chip. Another name for the MAC address is the UAA. Therefore, if the UAA can be overridden and a new number assigned, the package sent to the address can be controlled remotely and automatically. A server on the LAN that recognizes the client computer's MAC address will respond in a pre-determined way. The PEL allows the assignment of pre-selected LAA's that can provide different boots for different uses.

The RPL/PXE Emulation of the first programs further allows the option of remote booting of multiple operating systems. For example, with the RPL/PXE emulation and its ability to alias the MAC address, the PEL can offer different operating systems from the same server, different operating systems from different servers, different versions of the same operating system from the same server and different versions of the same operating system from different servers. Moreover, PEL can be offered from a primary server, a backup server or a different server. Additionally, PEL can present different workstation functions.

To implement these types of options the administrator would define the appropriate LAA's in a table assigning the LAA's to specific operating systems or packages of operating systems, drivers, and applications. When a request is received from workstation the LAA corresponding to the pre-selected package assigned by the administrator can be sent and assigned to the workstation. The PEL would then follow through by sending the appropriate operating system or package to the now assigned LAA. For example, for an administrator to give workstations the ability to automatically boot and/or boot and receive applications the administrator would define an LAA corresponding to the operating system or package that the administrator wanted to be automatically sent to that workstation. PEL would, upon receipt of the proper user identification and password override the UAA with th LAA of the desired package and then the package would be sent to the LAA. Only the server where that particular LAA address is defined will respond.

Figure 5A:
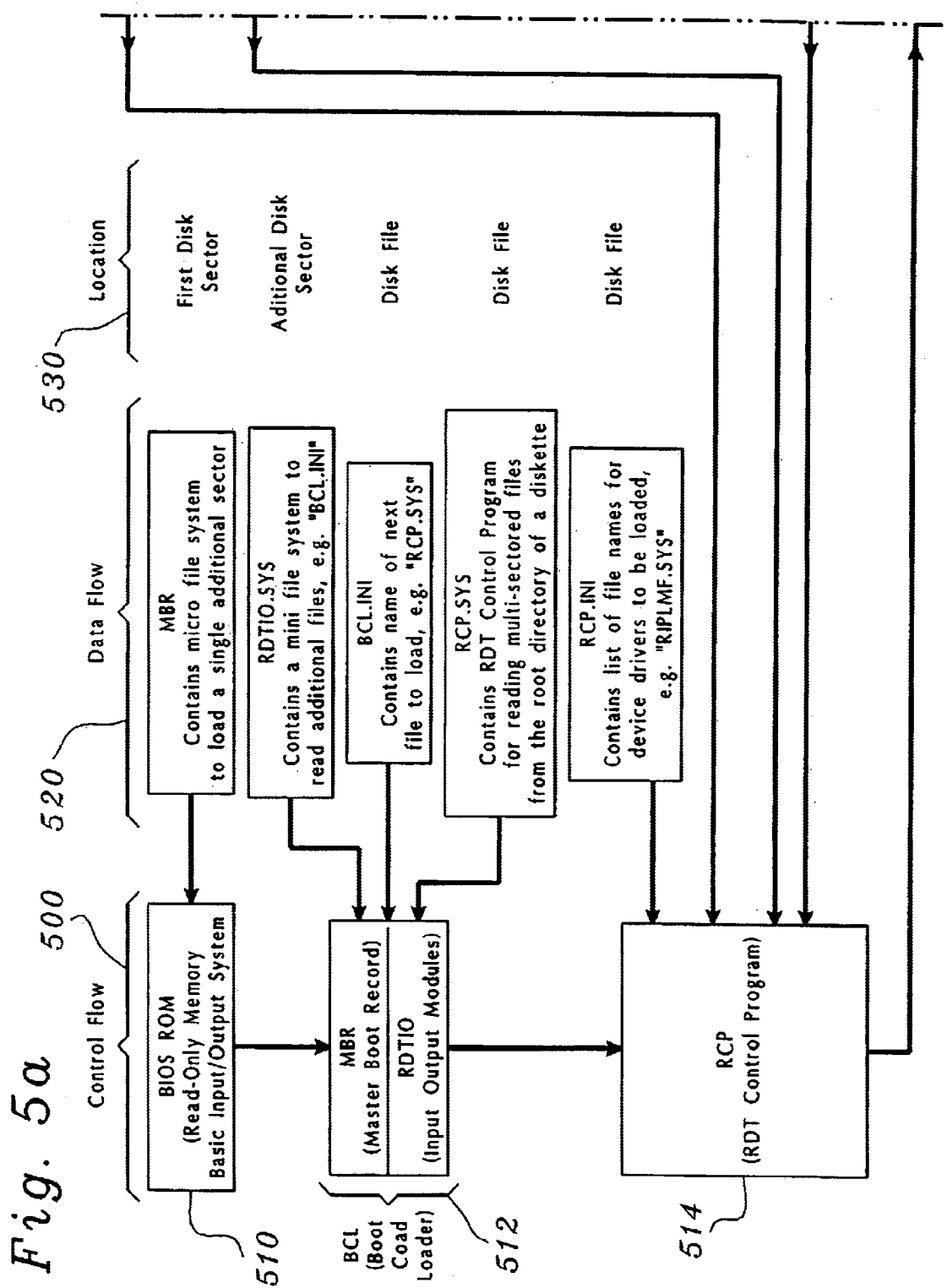
FIGS. 5A and 5B depict a flow chart of the workstation process.
Figure 5B:
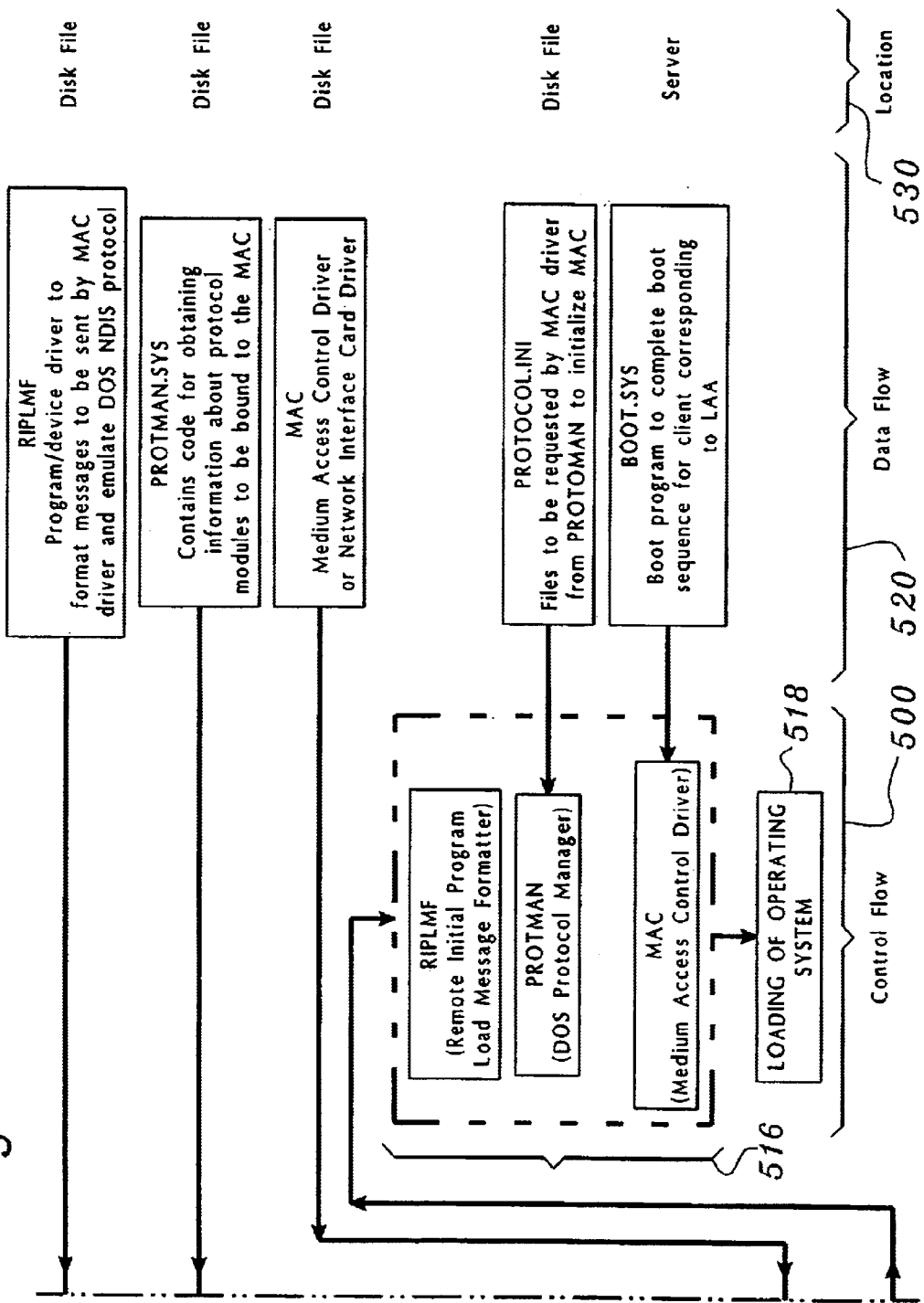

With reference now to FIGS. 5A and 5B, a flowchart depicts the control flow, the data flow, and the location of data and instructions used in the Pre-Execution Logon. This figure provides a slightly different perspective compared with FIG. 4, showing the manner in which files are loaded and then the order in which the code segments witin the files obtain control. Control flow 500 shows the manner in which a program, device driver, or set of instructions passes control from one component to another. A generalized sequence of steps performs part of the boot sequence of the client, and each step completes a portion of the sequence before relinquishing control to the next portion. Each of these components comprises instructions that are executed to perform a set of fimctions. BIOS ROM 510 initializes the client, loads BCL 512, and passes control to BCL 512. As shown, BCL 512 may contain a plurality of components that are not necessarily executed sequentially before relinquishing control. Once BCL 512 bas loaded RCP 514, BCL 512 passes control to RCP 514, which loads components 516, which may contain programs and/or device drivers RCP 514 may direct control of components 516 or may pass control to components 516, which are not necessarily executed sequentially. Once operating system 518 has been retrieved from the server, control of the client computer is relinquished to operating system 518, which then proceeds to complete the boot process for the client. Data flow 520 shows the data or set of instructions which are loaded by the software components shown as control flow 500. Although the components in data flow 520 have been given names, these file names may be used for representative purposes only. Other configurations of components in data flow 520 may also be incorporated, and the depicted example in FIGS. 5A and 5B is not meant to imply configurable limitations with respect to the present invention. Locations 530 provide information on the source location for the components in data flow 520.

Figure 6:
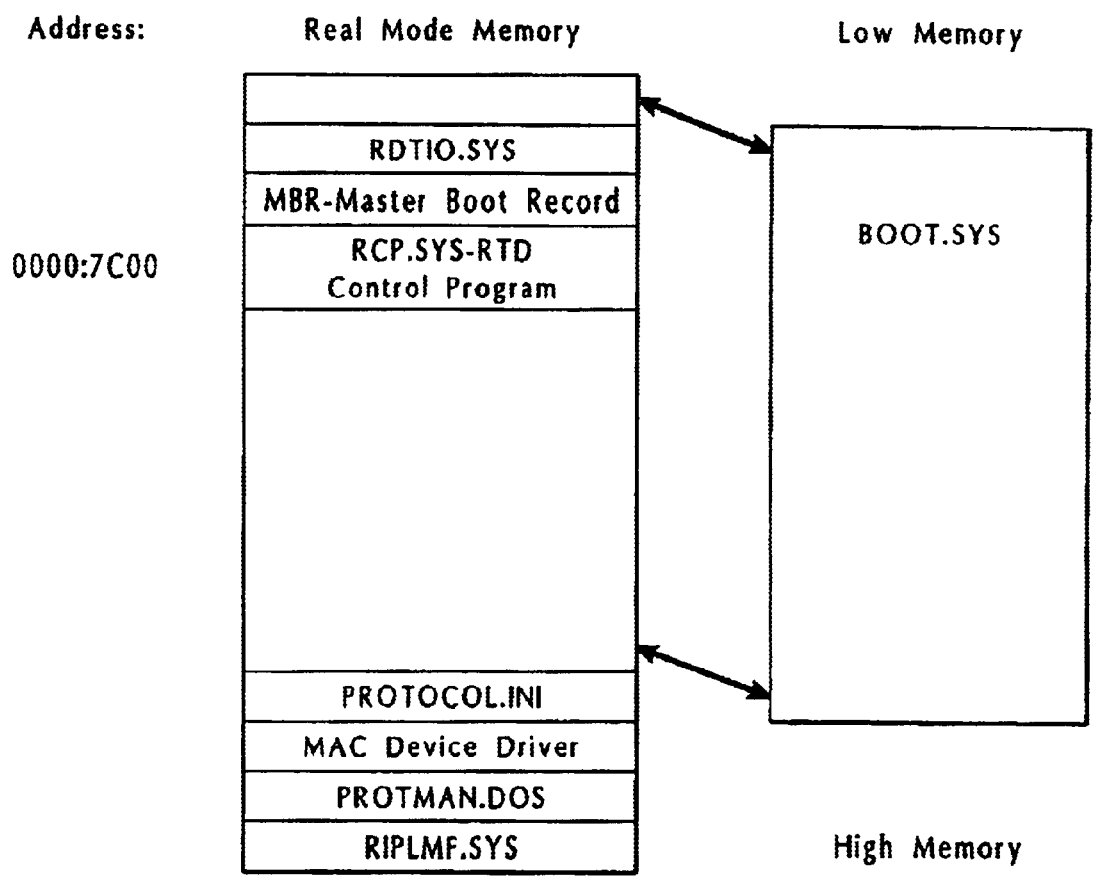
FIG. 6 depicts a diagram of workstation memory.

With reference now to FIG. 6, a block diagram depicts a memory map of real mode memory in a 80×86 machine as used in the present invention. Virtually all PC's in use today allow real mode addressing from location zero (0000:0000) to 640k (AOOO:0000). The diagram shows that the BCL, consisting of the MBR and RDTIO, locate themselves in low storage, and load RCP.SYS at location 0000:7COO. This is actually a predefined location where code will be loaded by the BIOS when booting from a diskette. RCP then loads all required modules into the highest addresses possible. This is done so that the boot blocks for the operating systems to be sent by the server can be loaded in low memory at the operating systems own requested location. When all drivers have been loaded and initialized, RCP gives control to RIPLMF in high memory and is no longer required. RIPLMF will load Boot. Sys for the operating system corresponding to the assigned LAA over all of RCB's code in low memory. This can be done because all DOS emulation, which was done by the RCP, is no longer required. RIPLMF acts as both an application program and NDIS protocol device driver. As such, there is a guarantee that DOS emulation will not be necessary.

Figure 7:
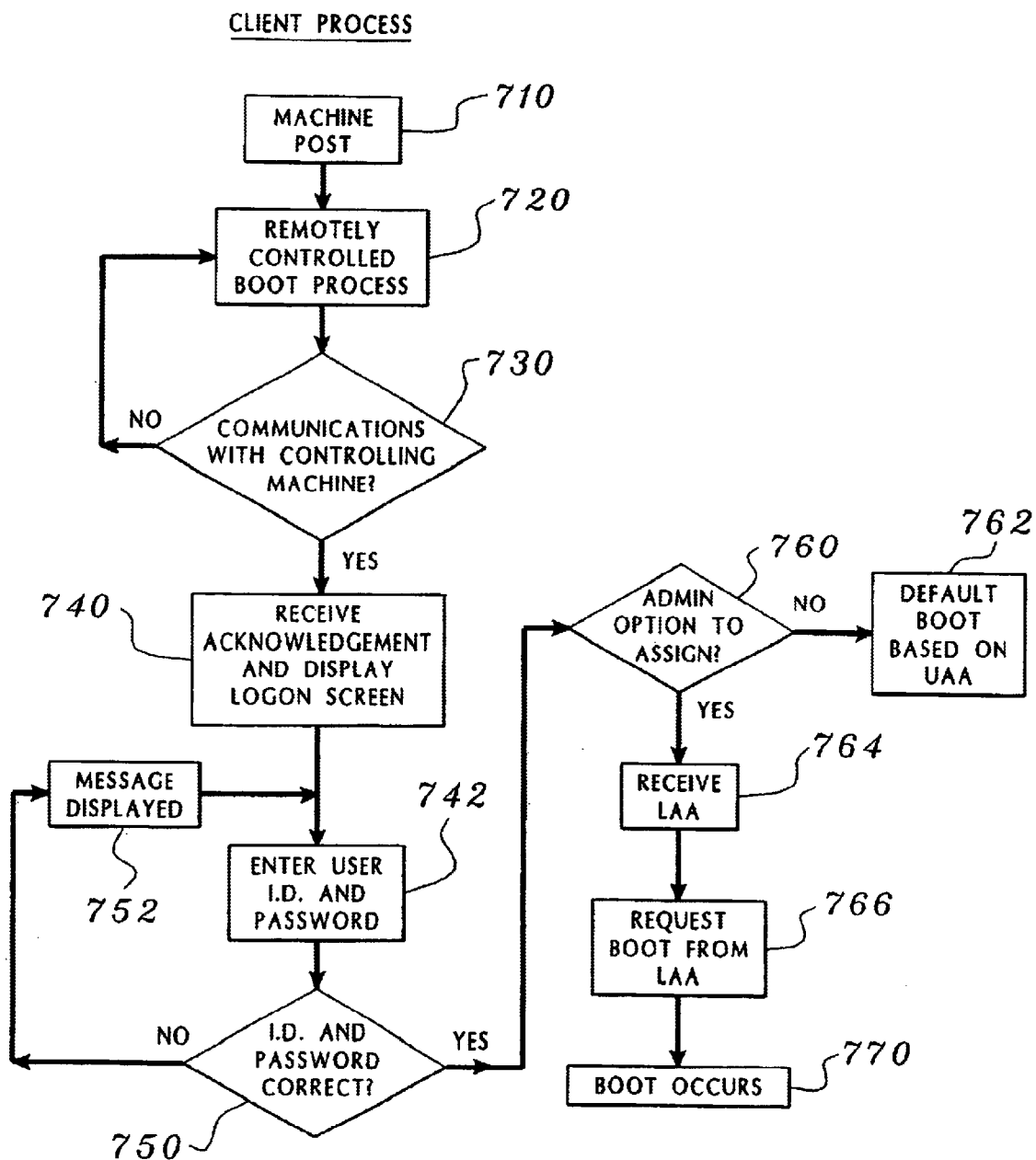
FIG. 7 depicts a flow chart of the workstation process.

FIG. 7 depicts the process at the workstation. The first step is the Machine Power On Self Test (POST) (710). The Machine is powered on and goes through its standard power on testing before giving control to the boot manager process. The remotely controlled boot process initiates, providing a means for the discovery frames to be sent (720). Next, the PEL process attempts to communicate with the controlling server for the logon screen (730). If Contact is made with the controlling server, the client machine will receive an acknowledgment and, upon receipt of the acknowledgment, the client machine will display the logon screen (740). If Contact cannot be made with the server, the process will proceed to step 720. The user will enter the users identification number and password (742). A determination is made whether the user identification and password are correct (750). If the password and identification number are correct, the next determination is whether the administrator has assigned a boot package to that particular user identification (760). If the identification number and password are not correct, then a message will be displayed (752) and the process will begin just prior to step 742. If the administrator has not assigned a boot package to that particular user identification, then the default boot proceeds based on UAA (762). If the administrator has assigned a boot package to that particular user identification, then a LAA corresponding to that boot package will be assigned the workstation. The LAA will override the old UAA (MAC address) when received (764). The client will ask for the boot server with the new LAA (766). Boot will proceed based on the new LAA (770).

Figure 8:
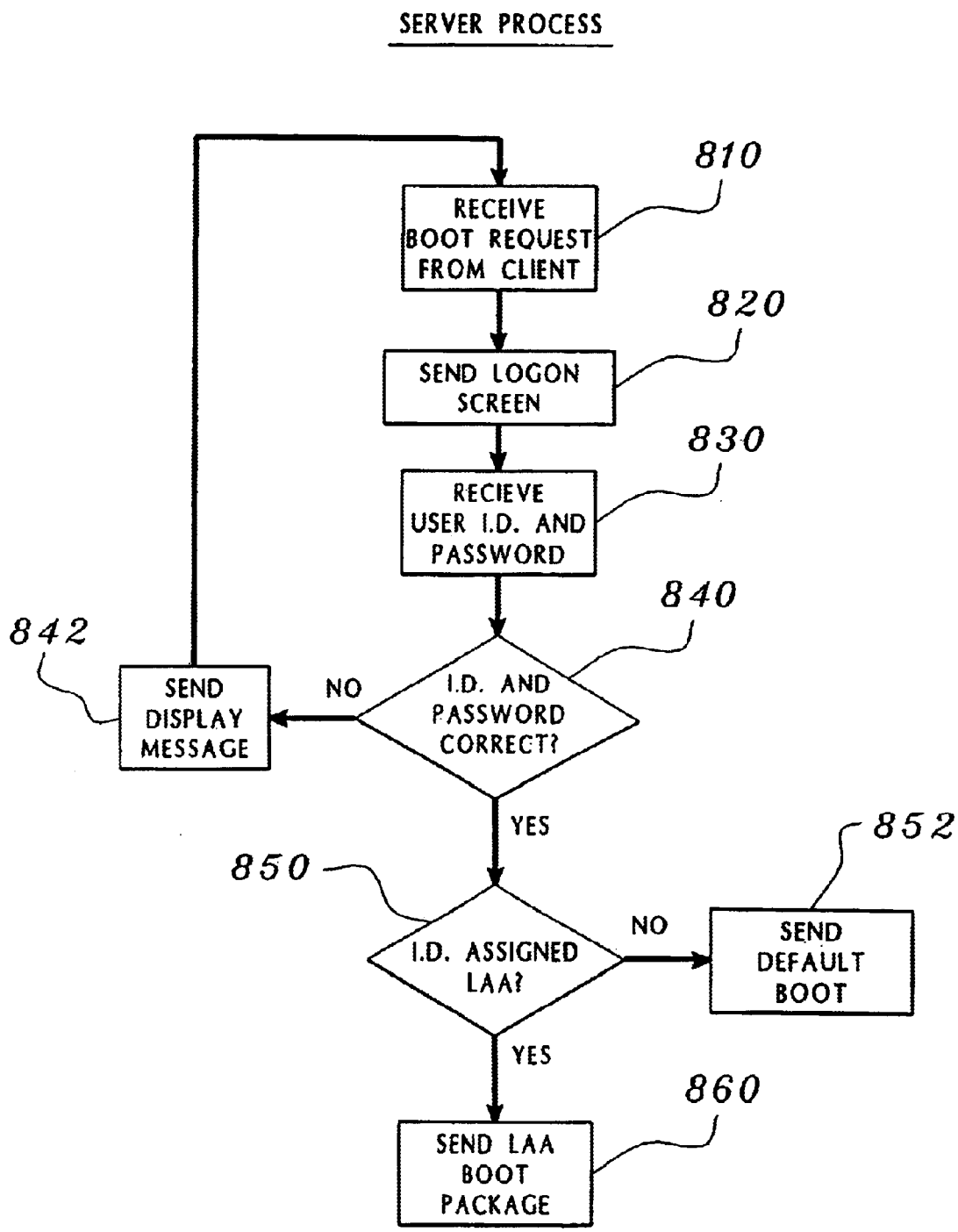
FIG. 8 depicts a flow chart of the server process.

FIG. 8 depicts the process at the server. First, the PEL receives a boot request from the client (810). The saver sends an acknowledgment to the client (820). The server next receives the user identification and password fomn the client workstation (830). Next, PEL verifies tat the user identification number and the password are correct (840). If the user identification and password are not correct, PEL sends a display message (842) and returns to step 810. If the user identification and password are correct, PEL determines whether the administrator has assigned an LAA to that user identification (850). Next, the PEL sends the boot package to the workstation that corresponds to the LAA (860). If an LAA is not assined to that user identification. PEL sends the default boot (852).

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed:

1. A method for controlling access to a workstation from a server comprising the steps of:
   sending a discovery frame from the workstation to the server;
   receiving an acknowledgment from the server;
   responsive to receiving the acknowledgment, displaying a log on screen at the workstation;
   entering a user identification and a password at the workstation;
   validating the user identification and the password at the server;
   responsive to validation of the user identification and the password, sending a program to the workstation from the server;
   responsive to validating said user identification and the password, determining a locally administered address assigned to said user identification; and
   sending the locally administered address to the workstation to override a workstation universally administered address;
   receiving said program at the workstation; and
   booting said workstation from said program.

2. The method of claim 1 wherein the sending step further comprises:
   selecting an operating system assigned by an administrator based on the user identification.

3. A programmable apparatus for controlling access to a workstation computer comprising:
   programmable hardware comprising:
      server computer; and
      the workstation conputer;
   a plurality of network interface cards connected to said programmable hardware;
   a network connecting said server computer and said workstation computers;
   a remotely controlled boot program installed on said workstation computer;
   a pre-execution logon program installed on said server computer for validating a user identification and a password;
   wherein said workstation computer is directed by said remotely controlled boot program to send a first request to said server computer;
   responsive to said first request, said server computer sending an acknowledgment to said workstation computer;
   responsive to receiving said acknowledgments said workstation computer displaying a log on screen for entering the user identification and the password;
   responsive to said pre-execution logon program validating said user identification and the password, said server computer transmitting an operating system to said workstation computer; and
   wherein said server computer overrides a tuliversally administered address of the workstation computer with a locally administered address and sends the operating system corresponding to a locally administered address to said workstation computer.

4. A computer readable memory for causing a server computer to control a boot of a workstation computer comprising:
   a storage medium located in the server computer;
   a pre-execution logon program stored in said storage medium;
   the storage medium, so configured by said pre-execution logon program, responsive to receipt of a user identification and a password from the workstation computer, validates said user identification and password;
   sends an operating system to said workstation computer;
   wherein the pre-execution logon program causes the server computer to send a locally administered address to said workstation computer; and
   responsive to a request from said workstation computer, causes the server computer to transmit a program addressed to said locally administered address to said workstation computer.

5. A computer implemented process to control booting of a workstation computer from a server computer comprising:
   using the workstation computer, performing steps comprising:

powering the workstation computer;

obtaining control of the workstation computer by means of a first program;

executing, without an operating system, the first program to communicate with the server computer;

communicating a first request to the server computer;

receiving a first acknowledgment at the workstation computer;

displaying a log on screen at the workstation computer;

entering a user identification and a password at the workstation computer;

sending a locally adiministered address from the server computer to the workstation computer;

receiving the locally administered address from the server computer;

responsive to receiving said locally administered address, sending the second request to the server;

receiving a boot progran corresponding to the locally administered address;

booting the workstation computer from said boot program;

using the server computer, performing steps comprising:

responsive to the first request from the server computer, sending a second acknowledgment to the workstation computer; and responsive to a second request from the server computer, sending an operating system.

6. The computer implemented process of claim 5 further comprising:

selecting the locally administered address corresponding to the user identification;

sending said locally administered address to the workstation computer; and sending the operating system corresponding to said workstation computer.

7. A method for controlling access to a client computer from a server computer, the method comprising the computer implemented steps of:

executing instructions from a client computer fist memory to load a boot code loader from a client computer second memory, wherein the client computer first memory is a BIOS ROM and the client computer second memory is a nonvolatile, read/write memory;

excecuting the boot code loader to load a control program from the client computer second memory;

executing a control program to load a set of programs from the client computer second memory without loading an operating system;

executing the set of programs to communicate a first message to the server computer;

responsive to said first message, receiving an acknowledgment from the server computer;

sending a locally administered address to the client computer;

responsive to retrieving said locally administered address from the server computer, executinig the set of programs to communicate a second message to the server computer; and responsive to said second message, receiving at least one progam addressed to said locally administered address from the server computer;

responsive to receiving said acknowledgment, displaying a log on screen;

entering a user identification and a password;

sending the user identification and the password to the server computer;

responsive to said server computer validating said user identification and the password, sending a boot program to the client computer; and executing the boot program at the client computer.

\* \* \* \* \*